United States Patent
Wang

(10) Patent No.: US 8,319,498 B2
(45) Date of Patent: Nov. 27, 2012

(54) MICRORESISTIVITY IMAGING AT MULTIPLE DEPTHS OF INVESTIGATION

(75) Inventor: Tsili Wang, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 624 days.

(21) Appl. No.: 12/581,237

(22) Filed: Oct. 19, 2009

(65) Prior Publication Data

US 2011/0089950 A1    Apr. 21, 2011

(51) Int. Cl.
*G01V 3/00* (2006.01)
(52) U.S. Cl. .......................... 324/369; 324/366; 324/370
(58) Field of Classification Search .................. 324/369
See application file for complete search history.

(56) References Cited

U.S. PATENT DOCUMENTS

| | | |
|---|---|---|
| 4,282,486 A | 8/1981 | Culver et al. |
| 4,594,552 A | 6/1986 | Grimaldi et al. |
| 5,191,290 A | 3/1993 | Gianzero et al. |
| 5,235,285 A | 8/1993 | Clark et al. |
| 5,339,037 A | 8/1994 | Bonner et al. |
| 6,173,793 B1 | 1/2001 | Thompson et al. |
| 6,191,588 B1 | 2/2001 | Chen |
| 6,359,438 B1 | 3/2002 | Bittar |
| 6,373,254 B1 | 4/2002 | Dion et al. |
| 6,600,321 B2 | 7/2003 | Evans |
| 6,714,014 B2 | 3/2004 | Evans et al. |
| 6,891,377 B2 | 5/2005 | Cheung et al. |
| 7,046,010 B2 | 5/2006 | Hu et al. |
| 7,066,282 B2 | 6/2006 | Chen et al. |
| 7,098,664 B2 | 8/2006 | Bittar et al. |
| 7,242,194 B2 | 7/2007 | Hayman et al. |
| 7,250,768 B2 | 7/2007 | Ritter et al. |
| 7,265,553 B2 | 9/2007 | Cheung et al. |
| 7,284,605 B2 | 10/2007 | Clark et al. |
| 2002/0166699 A1* | 11/2002 | Evans ............................ 175/26 |
| 2006/0255811 A1 | 11/2006 | Bittar et al. |
| 2009/0085570 A1 | 4/2009 | Signorelli et al. |
| 2009/0237082 A1 | 9/2009 | Samworth |
| 2011/0187374 A1* | 8/2011 | Wang ............................ 324/369 |

FOREIGN PATENT DOCUMENTS

WO    2009126150 A1    10/2009

OTHER PUBLICATIONS

International Search Report and Written Opinion dated Mar. 24, 2011 for corresponding PCT application No. PCT/US2010/053115 filed Oct. 19, 2010.

\* cited by examiner

*Primary Examiner* — Thomas Valone
(74) *Attorney, Agent, or Firm* — Darla P. Fonseca

(57) ABSTRACT

A microresistivity logging tool includes a dual function electrode deployed between a guard electrode and a return electrode. A drive circuit enables the electrical potential of the dual function electrode to be independently controlled so as to control a depth of investigation of a microresistivity measurement. The depth of investigation tends to increase with increasing electrical potential of the dual function electrode.

21 Claims, 8 Drawing Sheets

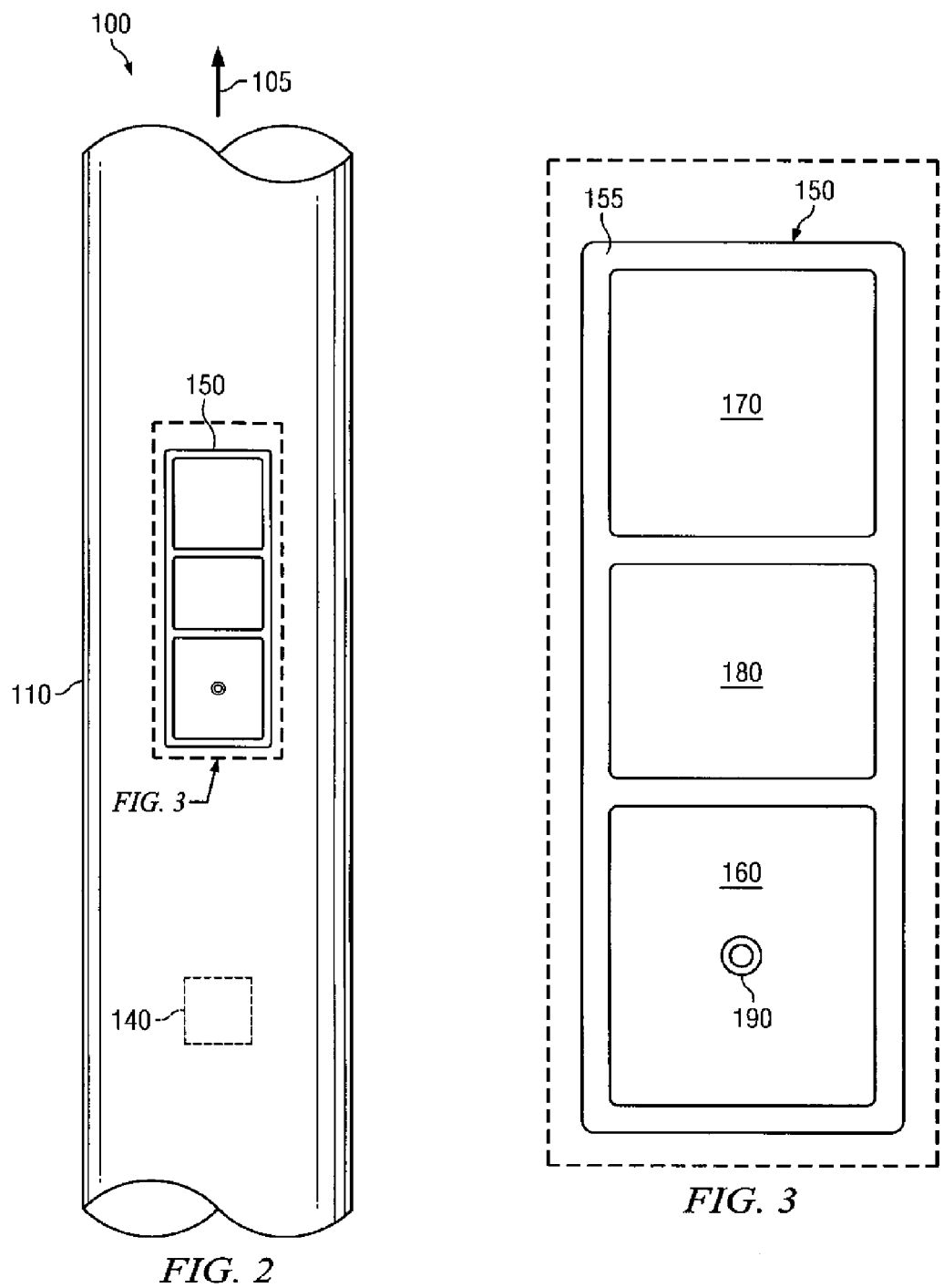

MICRORESISTIVITY IMAGING AT MULTIPLE DEPTHS OF INVESTIGATION

RELATED APPLICATIONS

None.

FIELD OF THE INVENTION

The present invention relates generally to microresistivity logging measurements. More particularly, embodiments of the invention relate to a logging while drilling tool configured for making microresistivity measurements at multiple depths of investigation.

BACKGROUND OF THE INVENTION

The use of electrical measurements in prior art downhole applications, such as logging while drilling (LWD) and wireline logging applications, is well known. Such techniques may be utilized, for example, to determine a subterranean formation resistivity, which, along with formation porosity measurements, may be used to indicate the presence of hydrocarbons in the formation. It is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Microresistivity measurements of a subterranean formation are commonly made by focusing an electrical current into the formation. Microresistivity sensors generally include at least three electrodes: a guard electrode, a return electrode, and a measuring electrode which may be deployed in and electrically isolated from the guard electrode. In use, an AC voltage is commonly applied between the guard electrode and the return electrode, which results in an alternating current being passed through the formation between the guard and return electrodes. Meanwhile, the measuring electrode is commonly held at the same potential as the guard electrode. The alternating current in the measuring electrode is monitored and tends to be indicative of the resistivity of the formation opposing the electrode. As is known to those of ordinary skill in the art, the formation resistivity $R_a$ may be expressed mathematically, for example, as follows:

$$R_a = k \frac{\Delta V}{I} \quad \text{Equation 1}$$

where k is a geometric factor, $\Delta V$ represents the potential difference between the measuring electrode and a reference point, and I represents the current in the measuring electrode. The formation resistivity $R_a$ is sometimes referred in the art as an apparent resistivity indicating that the computed quantity is at least partially related to the true formation resistivity.

In downhole drilling applications it is often desirable to make microresistivity measurements at multiple depths (at least two depths) of investigation into the formation. The benefits of making measurements at multiple depths of investigation are numerous. For example, measurements at multiple depths may enable environmental effects, such as the presence of an invasion zone, to be identified. Measurements at multiple depths of investigation may also improve the accuracy (or reduce the uncertainties) in formation dip calculations. Furthermore, measurements at multiple depths provide data redundancy and may therefore improve accuracy and data quality control.

Various tool configurations are disclosed in the prior art for making microresistivity measurements at multiple depths of investigation. For example, U.S. Pat. No. 4,594,552 to Grimaldi et al discloses a wireline tool in which three longitudinally spaced measuring electrodes are deployed in the guard electrode. The depth of investigation at each measuring electrode is said to be a function of the longitudinal distance between that electrode and the return electrode.

U.S. Pat. Nos. 5,235,285 and 5,339,037 to Bonner et al. disclose a logging while drilling tool including a wound toroidal core antenna deployed about the tool body and a plurality longitudinally spaced current measuring electrodes deployed in the tool body. Similar to the Grimaldi tool, the depth of investigation at each measuring electrode is said to be a function of the longitudinal distance between that electrode and transmitter.

U.S. Pat. No. 7,046,010 to Hu et al teaches a pad mounted electrode configuration that makes use of five concentric electrodes and a central current sensing electrode. The concentric electrodes can be used either for current focusing or current return with the outer boundary of the outermost electrode defining a current focusing area. Increasing the current focusing area is said to increase the depth of investigation.

One common feature of the above-referenced tools is that they require a large number of electrodes in order to make microresistivity measurements at multiple depths of investigation. In general, in the prior art the number of achievable depths of investigation tends to be approximately proportional to the number of electrodes utilized. One drawback with the use of additional electrodes (to achieve additional depths of investigation) is that they tend to increase the complexity of the sensor, which in turn tends to increase costs and decrease the reliability of microresistivity tools employing such sensors. Therefore, there is a need for a microresistivity sensor that enables measurements to be made at multiple depths of investigation without requiring the use of a large number of electrodes.

SUMMARY OF THE INVENTION

Aspects of the present invention are intended to address the above described need for improved microresistivity logging sensors. In one exemplary embodiment, the invention includes a logging tool having a dual function electrode interposed between a guard electrode and a return electrode. A drive circuit enables the electrical potential of the dual function electrode to be independently controlled so as to control the depth of investigation of the sensor. At low potentials, the dual function electrode tends to function as a return electrode resulting in a sensor having a relatively shallow depth of investigation. At high potentials, the dual function electrode tends to function as a guard electrode resulting in a sensor having a greater depth of investigation. At intermediate potentials, the dual function electrode tends to function as both guard and return resulting in a sensor having an intermediate depth of investigation.

Exemplary embodiments of the present invention may advantageously provide several technical advantages. For example, the invention enables the depth of investigation of a microresistivity logging measurement to be selected (or tuned) within a preselected range of depths while drilling. As a result, environmental effects (e.g., invasion) can be accounted for in substantially real time while drilling by changing the selected depth or depths of investigation.

The invention further enables measurements to be made simultaneously at multiple depths of investigation using a single measuring electrode. As a result, the invention may simplify the electrode configuration (and the corresponding electronic configuration) of microresistivity sensors. Such simplification may improve tool reliability downhole.

The use of the dual function electrode further allows for multiple depths of investigation without requiring the use of additional measuring electrodes. Exemplary embodiments of the present invention may advantageously achieve multiple depths of investigation using a single measuring electrode. The invention may therefore substantially eliminate measurement errors caused by electrode to electrode variations (e.g., electrode to electrode surface impedance variations).

In one aspect the present invention includes a logging while drilling microresistivity tool. The tool includes guard, measuring, return, and dual function electrodes deployed on a logging while drilling tool body. The guard electrode is configured to inject electrical current into a formation. The measuring electrode is deployed in and electrically isolated from the guard electrode. The return electrode is spaced apart from the guard electrode and provides a return path for the electrical current. The dual function electrode is interposed between the guard electrode and the return electrode. A controller is configured to independently control an electrical potential of the dual function electrode.

In another aspect, the present invention includes a logging while drilling microresistivity tool. The tool includes a microresistivity sensor deployed in a logging while drilling tool body. The sensor includes a guard electrode configured to inject electrical current into a formation and a measuring electrode deployed in and electrically isolated from the guard electrode. The sensor further includes a return electrode spaced apart from the guard electrode and a dual function electrode interposed between the guard electrode and the return electrode. A controller is configured to (i) inject electrical current into the formation at the guard electrode simultaneously at first and second frequencies, (ii) set the electrical potential of the dual function electrode to a first low potential at the first frequency and to a second high potential at the second frequency, and (iii) measure electrical currents in the measuring electrode at the first and second frequencies.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 depicts one exemplary embodiment of a microresistivity tool in accordance with the present invention.

FIG. 3 depicts an exemplary microresistivity sensor in accordance with the present invention.

DETAILED DESCRIPTION

Figure 1:
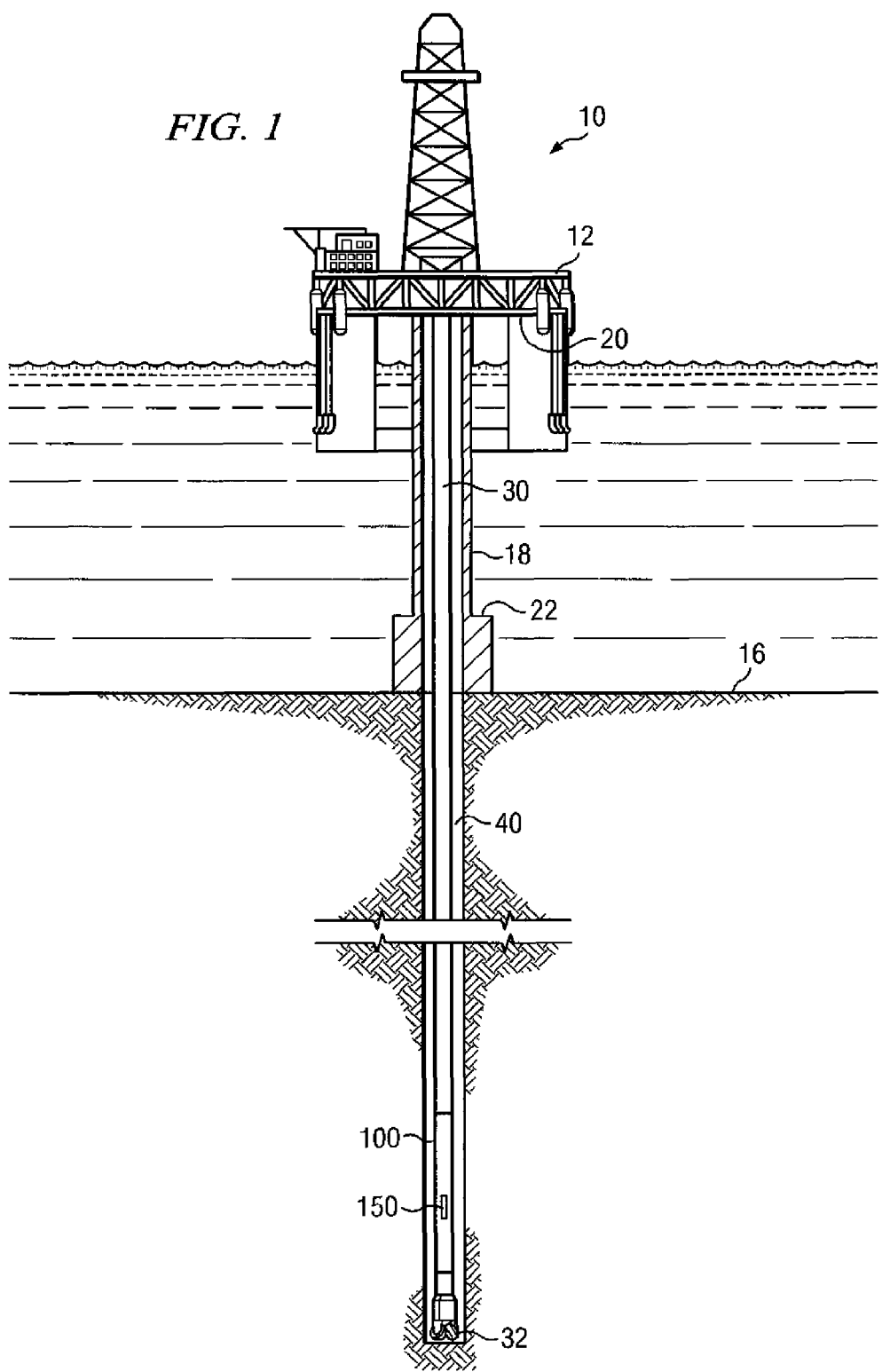
FIG. 1 depicts a conventional drilling rig on which exemplary embodiments of the present invention may be utilized.

Referring now to FIGS. 1 through 8, exemplary embodiments of the present invention are depicted. With respect to FIGS. 1 through 8, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 8 may be described herein with respect to that reference numeral shown on other views.

FIG. 1 depicts one exemplary embodiment of a microresistivity logging while drilling tool 100 in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and logging while drilling tool 100. Embodiments of LWD tool 100 include at least one microresistivity sensor 150. Drill string 30 may further include, for example, a downhole drill motor, a mud pulse telemetry system, a steering tool, and/or one or more of numerous other MWD and LWD sensors for sensing downhole characteristics of the borehole and the surrounding formation.

It will be understood by those of ordinary skill in the art that the deployment depicted on FIG. 1 is merely exemplary for purposes of describing the invention set forth herein. It will be further understood that logging tools in accordance with the present invention are not limited to use with a semisubmersible platform 12 as illustrated on FIG. 1. Measurement tool 100 is equally well suited for use with any kind of subterranean drilling operation, either offshore or onshore. While measurement tool 100 is shown coupled with drill string 30 on FIG. 1, it will also be understood that the invention is not limited to LWD embodiments, but may also be utilized in wireline microresistivity tools.

FIG. 2 depicts a portion of one exemplary embodiment of LWD tool 100. As described above with respect to FIG. 1, LWD tool 100 includes a microresistivity sensor 150 deployed on an LWD tool body 110. While not depicted on FIG. 2, it will be understood that sensor 150 may be deployed, for example, in a stabilizer blade or an enlarged diameter sleeve so as to reduce the standoff distance between the sensor 150 and the borehole wall. In the exemplary embodiment depicted, a long axis of the microresistivity sensor is substantially parallel with a longitudinal axis 105 of the tool 100. While this configuration is generally preferred for achieving optimum azimuthal coverage, the invention is expressly not limited in these regards.

LWD tool 100 may optionally further include an azimuth sensor 140 configured to measure the azimuth angle (toolface angle) of the microresistivity sensor 150 in substantially real time during drilling. Suitable azimuth sensors typically include one or more accelerometers, magnetometers, and/or gyroscopes and are well known in the art. It will be understood that the invention is not limited to any particular azimuth sensor configuration or even to the use of an azimuth sensor.

FIG. 3 depicts one exemplary embodiment of a galvanic microresistivity sensor 150 in accordance with the present invention. Sensor 150 includes a measuring electrode 190 deployed in and electrically insulated from a guard electrode 160. A spaced apart return electrode 170 provides a return path for electrical current injected by the measuring and guard electrodes. Sensor 150 further includes a dual-function electrode 180 interposed between the guard 160 and return 170 electrodes. The dual-function electrode 180 is so named (as described in more detail below) since it may function as a guard electrode and/or a return electrode. Electrodes 160, 170, and 180 are electrically isolated from one another via a conventional electrically insulating material 155.

It will be understood by those of ordinary skill in the art that the invention is not limited to the particular sensor configuration depicted on FIG. 3. In alternative embodiments, the electrodes may be deployed concentrically about one another, for example, with the measuring electrode deployed innermost, the guard electrode deployed about the measuring electrode, the dual function electrode deployed about the guard electrode, and the return deployed about the dual function electrode. In other alternative embodiments, the guard electrode may extend circumferentially about the entire tool body. In still other alternative embodiments the electrodes may be circumferentially or obliquely spaced on the tool body as opposed to longitudinally spaced as depicted on FIG. 3. The invention is not limited in regards to the spacing, shape, and/or size of the electrodes.

Figure 4:
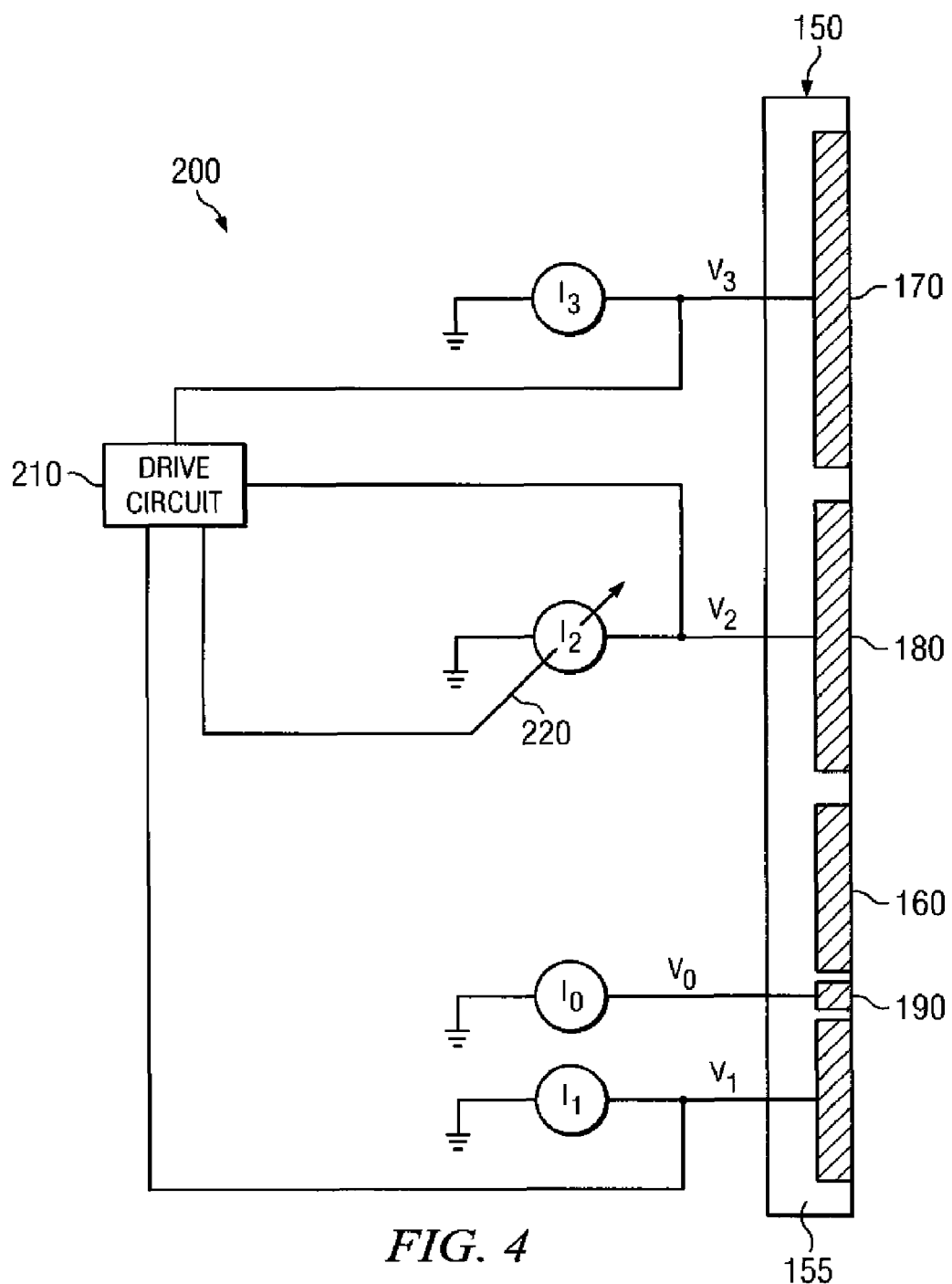
FIG. 4 depicts a longitudinal cross section of the sensor depicted on FIG. 3.

FIG. 4 depicts a longitudinal cross section of the sensor embodiment 150 depicted on FIG. 3. As depicted, sensor 150 further includes a local controller 200 including a drive circuit 210 that is configured to control the electrical potential of the dual function electrode 180 with respect to the guard 160 and return 170 electrodes. In the exemplary embodiment depicted, controller 200 includes a variable AC current supply 220 configured to control the current $I_2$ in the dual function electrode 180 so as to select the voltage $V_2$ thereof. In one preferred embodiment, the drive circuit 210 may be configured to set the electrical potential (voltage) of the dual function electrode 180 to substantially any potential between the electrical potentials (voltages) of the guard 160 and return 170 electrodes such that: $V_1 \leq V_2 \leq V_3$. While electrical potentials in the range from $V_1$ to $V_3$ are generally preferred, the drive circuit may also be configured to set the potential to of the dual function electrode to values outside of the range. Drive circuit 210 may be configured to set $V_2$ to discrete preselected values or to dynamically adjust the potential of the dual function electrode 180. The invention is not limited in any of these regards.

It will be understood that the controller 200 is typically further configured to control the current and/or the voltage at the guard 160 and measuring 190 electrodes. In order to achieve optimal focusing, the voltages at the guard and measuring electrodes are typically held equal to one another (i.e., $V_0 = V_1$). Methods for achieving such voltage control during microresistivity LWD operations are known in the art and are therefore discussed no further herein. The controller 200 is typically further configured to measure the electrical current $I_0$ in the measuring electrode. The controller may further be configured to compute an apparent microresistivity, for example, via Equation 1 and to correlate the computed microresistivity (or measured current) with a corresponding azimuth angle to facilitate microresistivity imaging. Such methodologies are also known in the art.

Figure 5:
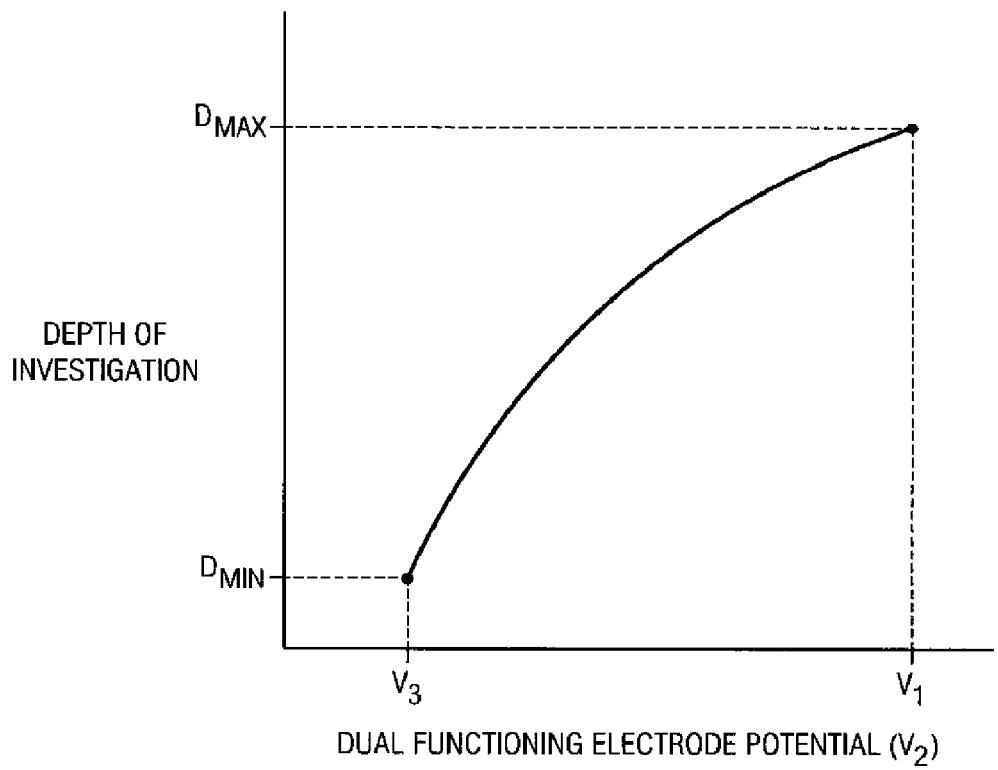
FIG. 5 depicts a plot of depth of investigation versus electrode potential for the exemplary sensor embodiment depicted on FIG. 4.
Figure 7:
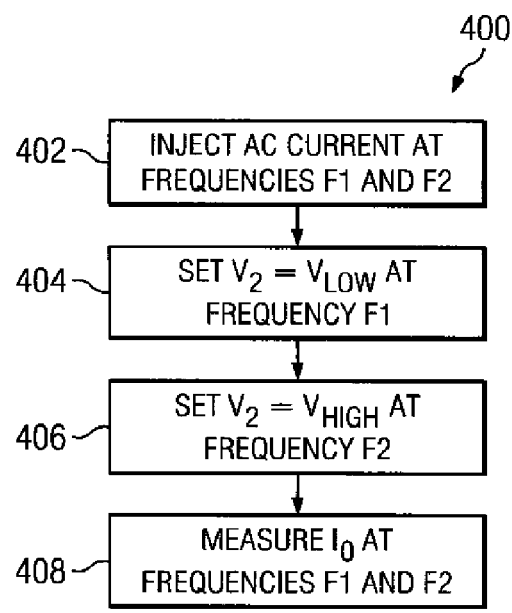
FIG. 7 depicts a flow chart of one exemplary method embodiment in accordance with the present invention.

With continued reference to FIG. 4 and further reference now to FIG. 5, it will be appreciated that sensors in accordance with the present invention enable microresistivity measurements to be made at a range of investigation depths. This may be accomplished by selecting the value of voltage $V_2$ (e.g., relative to voltages $V_1$ and $V_3$). FIG. 5 depicts a plot of the depth of investigation as a function of the voltage $V_2$ of the dual function electrode 180. As depicted, the depth of investigation is a minimum when the voltage $V_2$ of the dual function electrode 180 is about equal to the voltage $V_3$ of the return electrode 170. The depth of investigation tends to increase monotonically with increasing voltage to a maximum when the voltage $V_2$ of the dual function electrode 180 is about equal to the voltage $V_1$ of the guard electrode 160.

Figure 6A:
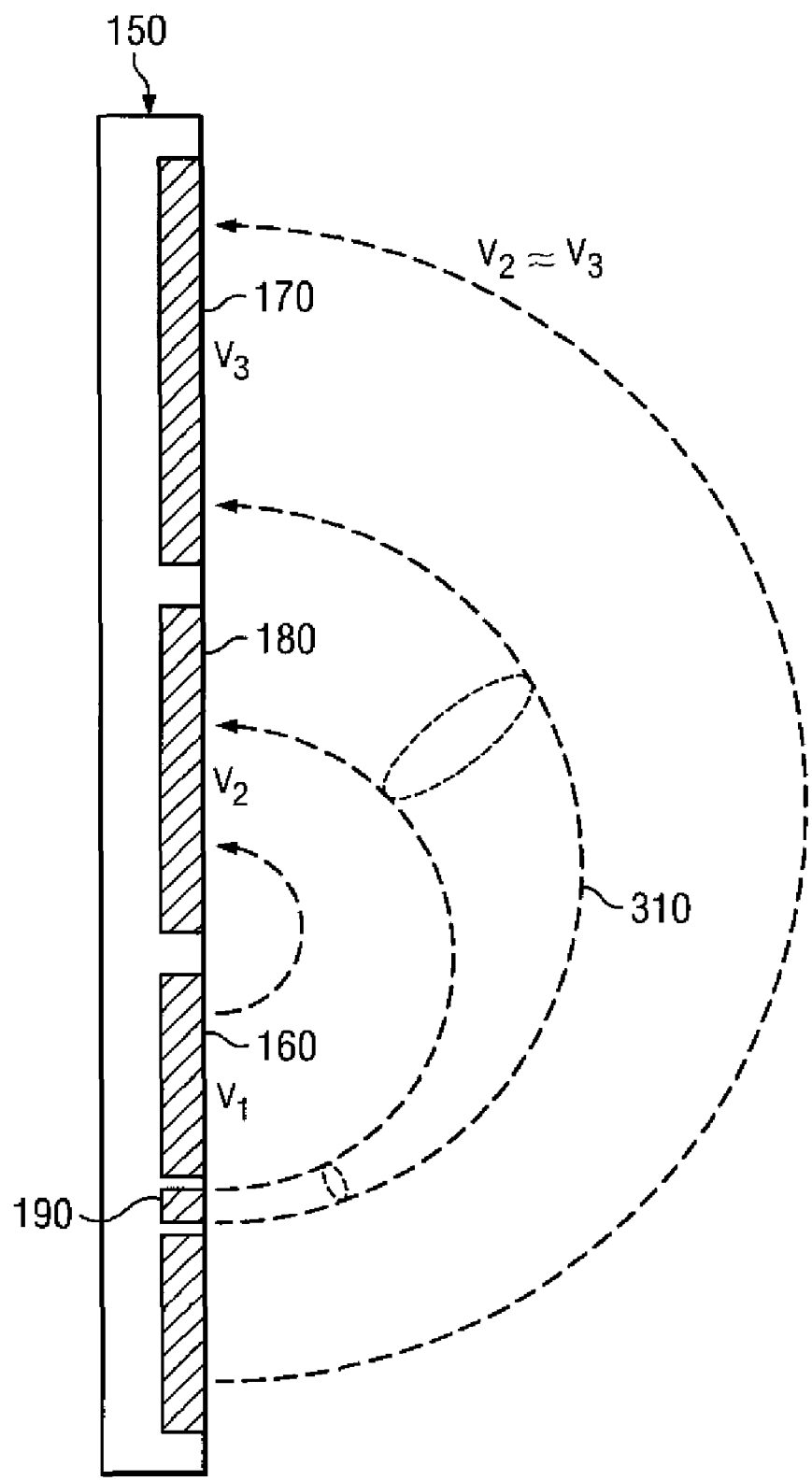
FIGS. 6A, 6B, and 6C (collectively FIG. 6) depict schematic current flow diagrams for the exemplary sensor embodiment depicted on FIG. 4.
Figure 6B:
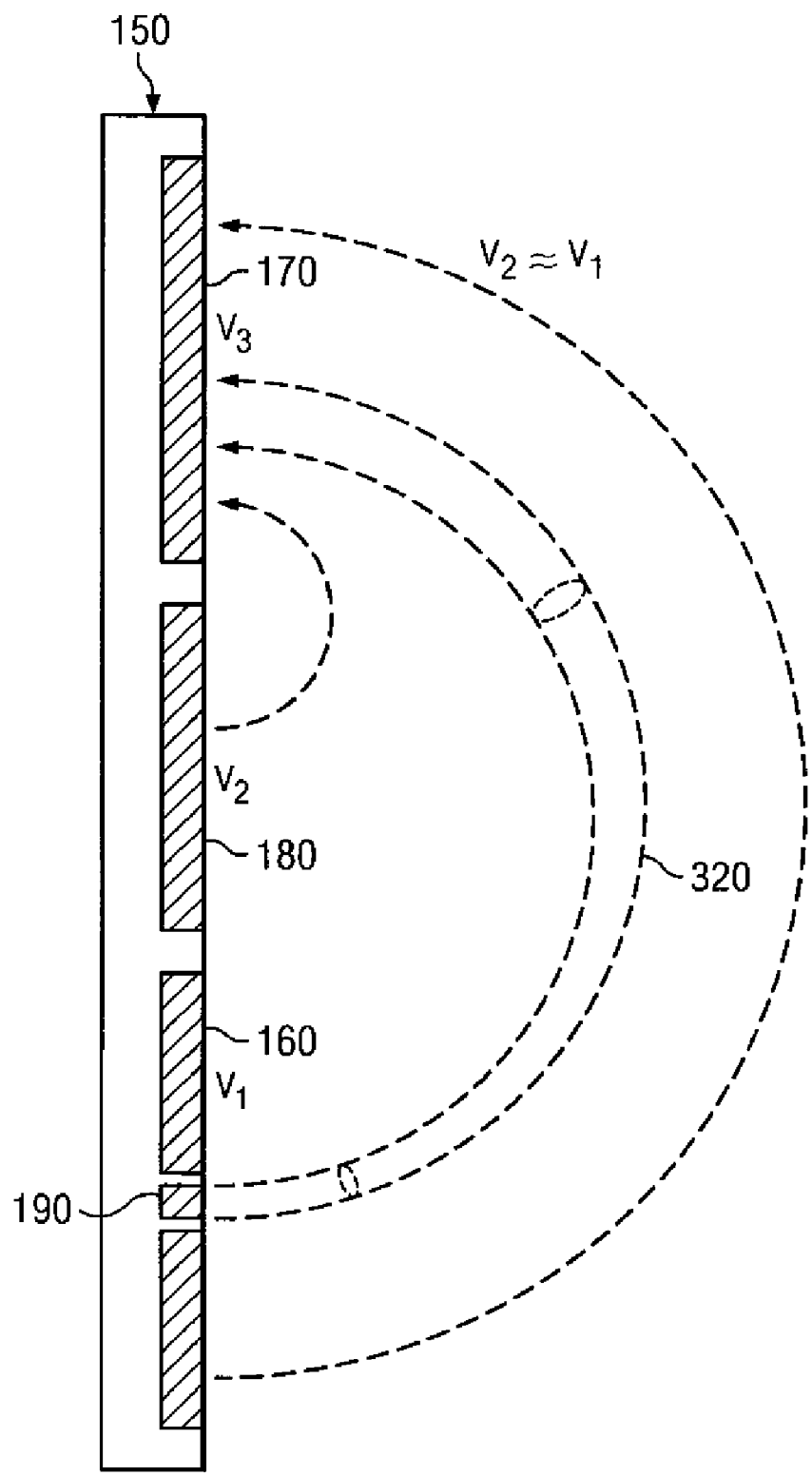
Figure 6C:
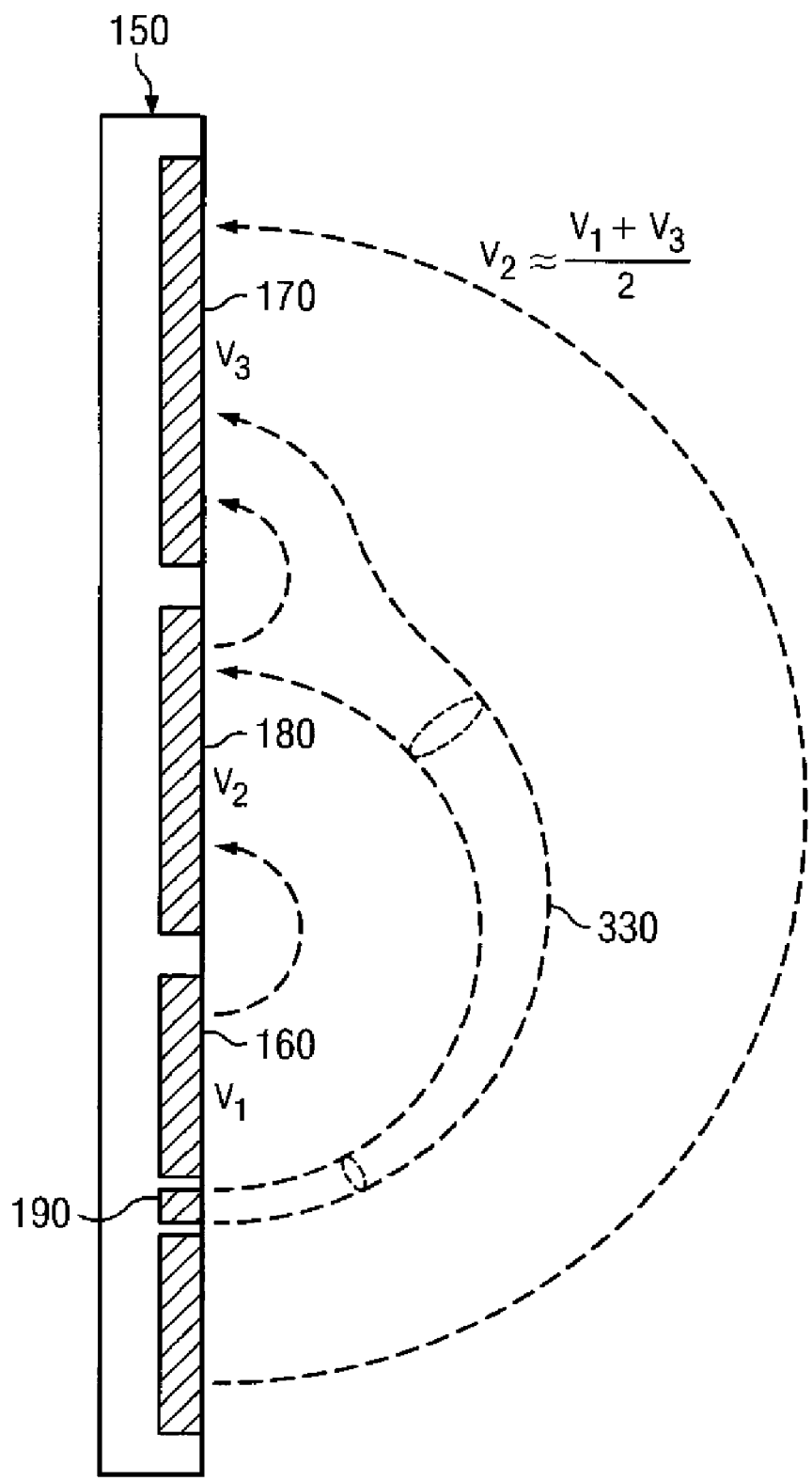

Turning now to FIGS. 6A, 6B, and 6C, the functionality of microresistivity sensor 150 is described in more detail. The relationship between the depth of investigation and the voltage $V_2$ of the dual function electrode 180 is described by way of hypothetical current tubes 310, 320, and 330 between the measuring electrode 190 and electrodes 170 and/or 180. This discussion is intended only to explain the aforementioned relationship between the depth of investigation and the voltage applied to the dual function electrode 180 and is not meant to limit the invention in any way. Those of skill in the art will appreciate that the current $I_0$ in the measuring electrode 190 is related to the electrical impedance in a current tube that extends from the measuring electrode 190 through the formation to electrodes 170 and/or 180. Each part of the formation (and drilling fluid) along the length of the tube contributes to the impedance of the tube with the portion of the tube having a smaller cross sectional area contributing more significantly to the impedance than the portion having a larger cross sectional area.

FIG. 6A depicts a configuration in which the voltage of the dual function electrode 180 is approximately equal to the voltage of the return electrode 170 ($V_2 = V_3$). When electrodes 170 and 180 are held at the same potential, the sensor 150 may be thought of as essentially reducing to a conventional three electrode arrangement in which the electrodes 170 and 180 (being at the same potential) both function as a return. This increases the area of the "return electrode" (with respect to the guard), which in turn results in the current tube 310 having a much larger cross sectional area near the return as compared to near the measuring electrode 190. The impedance of the current tube 310 therefore tends to be dominated by the impedance near the measuring electrode. Moreover, the measuring electrode 190 is located closer to the return (dual electrode 180), which tends to reduce the penetration depth of the current tube 310 into the formation.

FIG. 6B depicts a configuration in which the voltage of the dual function electrode 180 is approximately equal to the voltage of the guard electrode 160 ($V_2 = V_1$). When electrodes 160 and 170 are held at the same potential, the sensor 150 may also be thought of as essentially reducing to a conventional three electrode arrangement, however, one in which the electrodes 160 and 170 (being at the same potential) both function as a guard. This increases the area of the "guard electrode" (with respect to the return), which in turn results in the current tube 320 having a more uniform cross sectional area along its length. Moreover, the measuring electrode 190 is now located further from the return (return electrode 170) which increases the penetration depth of the current tube 320 into the formation.

FIG. 6C depicts a configuration in which the voltage of the dual function electrode 180 is held at an intermediate voltage between the voltages of the guard 160 and return 170 electrodes (e.g., at $V_2=(V_1+V_3)/2$). When the potential of the dual function electrode 180 is between the potentials of the guard and return electrodes, the dual function electrode tends to simultaneously function as both a current injector (guard) and a current return. The result is an intermediate depth of investigation that tends to vary monotonically with the potential of the dual function electrode 180, for example, as depicted on FIG. 5.

Measurements at multiple depths of investigation may be made simultaneously using the exemplary embodiment of the invention depicted on FIG. 4. For example, with respect to FIGS. 4 and 7, an AC current may be injected into a subterranean formation simultaneously at first and second frequencies F1 and F2 at the guard electrode at 402. Frequencies F1 and F2 may advantageously be in the range, for example, from about 0.1 to about 10 kHz for drilling operations using conductive drilling fluid. Meanwhile, at 404 and 406, the voltage $V_2$ of the dual function electrode 180 may be set to a first low potential at the first frequency (e.g., such that $V_2=V_3$) and to a second high potential at the second frequency (e.g., such that $V_2=V_1$). The injection currents $I_0$ may then be measured at 408 (preferably simultaneously) at each of the first and second frequencies. Those of ordinary skill in the art will appreciate that there is typically little or no interference between these injection currents since they are at distinct frequencies. These injection currents may be utilized to calculate first and second resistivity values corresponding to first and second depths of investigation (e.g., using Equation 1). It will be understood (in light of FIGS. 5 and 6) that in this example the measurement made at the first frequency has a shallower depth of investigation than the corresponding measurement made at the second frequency. It will further be understood that the invention is not limited to making measurements at only one or two distinct frequencies. Substantially any number of suitable frequencies (e.g., 3, 4, or more) may be utilized enabling simultaneous resistivity measurements to be made at a plurality of depths of investigation.

As described above, exemplary embodiments in accordance with the present invention advantageously enable microresistivity measurements to be made at multiple depths of investigation using only a single measuring electrode (e.g., electrode 190 in FIGS. 4-6). It will be understood, however, that the invention is not limited to sensor embodiments having a single measuring electrode. Sensor embodiments in accordance with the present invention may include substantially any suitable number of measuring electrodes deployed in the guard 160 and/or return 170 electrodes. Nor is the invention limited to any particular measuring electrode deployment location or spacing in the guard and/or return electrodes.

Figure 8:
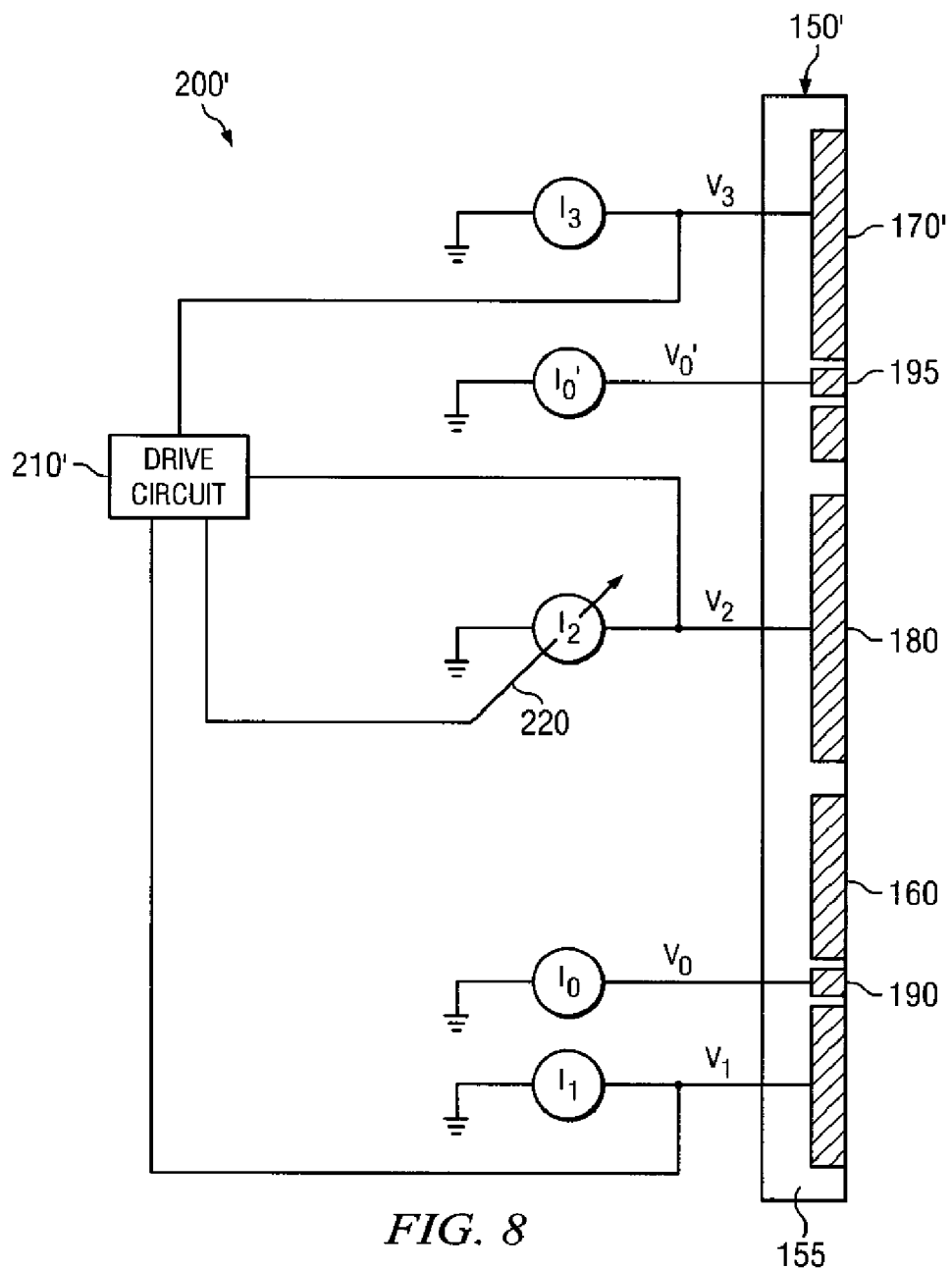
FIG. 8 depicts a longitudinal cross section of an alternative sensor embodiment in accordance with the present invention.

FIG. 8 depicts an alternative sensor 150' configuration in longitudinal cross section including at least first and second measuring electrodes 190 and 195. Measuring electrode 190 is deployed in and electrically isolated from guard electrode 160 as described above with respect to FIGS. 3 and 4. Measuring electrode 195 is deployed in and electrically isolated from the return electrode 170', preferably close to the edge of the electrode facing the dual function electrode 180. In the exemplary embodiment depicted, measuring electrode 190 is disposed to make comparatively deeper reading microresistivity measurements than is measuring electrode 195. Sensor 150' typically further includes a controller 200' including a drive circuit 210 that is configured to control the electrical potential of dual function electrode 180 as described above with respect to FIG. 4. The controller is typically further configured to set the voltage $V_0'$ of measuring electrode 195 equal to that of the return electrode 170 (i.e., $V_0'=V_3$) and to measure the current $I_0'$ in the measuring electrode 195.

With reference again to FIGS. 2 through 4, measurement tool 100 commonly includes an additional controller or a controller 200 with additional functionality. A suitable controller typically includes a programmable processor (not shown), such as a microprocessor or a microcontroller, and may also include processor-readable or computer-readable program code embodying logic, including instructions for controlling the function of the tool. A suitable controller may be utilized, for example, to make microresistivity measurements while drilling. As such the controller may further be configured to: (i) inject an alternating electrical current into a formation at the guard electrode, (ii) measure the electrical current in the measuring electrode, and (iii) compute a quantity at least partially related to the formation resistivity using the measured electrical current. A suitable controller may also be utilized to execute method 400 (FIG. 7) and may therefore be still further configured to (i) inject electrical current into a formation at multiple distinct frequencies, (ii) set the potential of the guard electrode to distinct values at the correspondingly distinct frequencies, and (iii) measure the electrical currents in the measuring electrodes at the distinct frequencies.

A suitable controller 200 may also be configured to construct LWD microresistivity images of the subterranean formation. In such imaging applications, the microresistivity measurements may be acquired and correlated with corresponding azimuth measurements (obtained, for example, from the directional sensors 140 deployed in the tool 100) while the tool rotates in the borehole. As such, the controller may therefore include instructions for temporally correlating LWD sensor measurements with sensor azimuth (toolface) measurements. The LWD sensor measurements may further be correlated with depth measurements. Borehole images may be constructed using substantially any known methodologies, for example, including conventional binning, windowing, or probability distribution algorithms. U.S. Pat. No. 5,473,158 discloses a conventional binning algorithm for constructing a borehole image. Commonly assigned U.S. Pat. No. 7,027,926 to Haugland discloses a technique for constructing a borehole image in which sensor data is convolved with a one-dimensional window function. Commonly assigned U.S. Pat. No. 7,558,675 to Sugiura discloses an image constructing technique in which sensor data is probabilistically distributed in either one or two dimensions.

A suitable controller may also optionally include other controllable components, such as other sensors, data storage devices, power supplies, timers, and the like. As described above, the controller is disposed to be in electronic communication with the various sensors deployed in the drilling system. The controller may also optionally be disposed to communicate with other instruments in the drill string, such as telemetry systems that further communicate with the surface or a steering tool. Such communication can significantly enhance directional control while drilling. A controller may further optionally include volatile or non-volatile memory or a data storage device for downhole storage of measured currents, microresistivity values, and/or LWD images. The invention is not limited in these regards.

Although the present invention and its advantages have been described in detail, it should be understood that various changes, substitutions and alternations can be made herein without departing from the spirit and scope of the invention as defined by the appended claims.

I claim:

1. A logging while drilling microresistivity tool comprising:
    a logging while drilling tool body;
    a guard electrode configured to inject electrical current into a formation;
    a measuring electrode deployed in and electrically isolated from the guard electrode;
    a return electrode spaced apart from the guard electrode, the return electrode providing a return path for the electrical current;
    a dual function electrode interposed between the guard electrode and the return electrode; and
    a controller configured to independently control an electrical potential of the dual function electrode.

2. The logging while drilling tool of claim 1, wherein the guard electrode, the return electrode, the measuring electrode, and the dual function electrode comprise a microresistivity sensor which is deployed on the tool body.

3. The logging while drilling tool of claim 1, wherein the guard electrode and the return electrode are longitudinally spaced apart from one another and the dual function electrode is deployed longitudinally between the guard electrode and the return electrode.

4. The logging while drilling tool of claim 1, wherein the controller is further configured to measure an electrical current in the measuring electrode and relate said electrical current in the measuring electrode to a resistivity of the formation.

5. The logging while drilling tool of claim 1, wherein the controller comprises a variable alternating current supply configured to control the electrical current in the dual function electrode, said control of the electrical current in the dual function electrode operative to control the electrical potential of the dual function electrode.

6. The logging while drilling tool of claim 1, wherein the controller is further configured to set the electrical potential of the dual function electrode to substantially any potential less than or equal to an electrical potential of the guard electrode and greater than or equal to an electrical potential of the return electrode.

7. The logging while drilling tool of claim 1, wherein the controller is further configured to set the electrical potential of the dual function electrode to one of at least three discrete preselected electrical potentials less than or equal to an electrical potential of the guard electrode and greater than or equal to an electrical potential of the return electrode.

8. The logging while drilling tool of claim 1, wherein the controller is further configured to:
    (i) inject electrical current into the formation at the guard electrode simultaneously at first and second frequencies;
    (ii) set the electrical potential of the dual function electrode to a first low potential at the first frequency and to a second high potential at the second frequency; and
    (iii) measure electrical currents in the measuring electrode at the first and second frequencies.

9. The logging while drilling tool of claim 1, further comprising a second measuring electrode deployed in and electrically isolated from the return electrode.

10. The logging while drilling tool of claim 1, further comprising an azimuth sensor configured to measure an azimuth angle of the measuring electrode.

11. A logging while drilling microresistivity tool comprising:
    a logging while drilling tool body;
    a microresistivity sensor deployed on the tool body, the sensor including (i) a guard electrode configured to inject electrical current into a formation, (ii) a measuring electrode deployed in and electrically isolated from the guard electrode, (iii) a return electrode spaced apart from the guard electrode, the return electrode providing a return path for the electrical current, and (iv) a dual function electrode interposed between the guard electrode and the return electrode; and
    a controller configured to independently control an electrical potential of the dual function electrode.

12. The logging while drilling tool of claim 11, wherein a long axis of the sensor is substantially parallel with a longitudinal axis of the tool body such that the guard electrode and the return electrode are longitudinally spaced apart from one another and the dual function electrode is deployed longitudinally between the guard electrode and the return electrode.

13. The logging while drilling tool of claim 11, further comprising a second measuring electrode deployed in and electrically isolated from the return electrode.

14. The logging while drilling tool of claim 11, further comprising an azimuth sensor configured to measure an azimuth angle of the measuring electrode.

15. A logging while drilling microresistivity tool comprising:
    a logging while drilling tool body;
    a microresistivity sensor deployed on the tool body, the sensor including (i) a guard electrode configured to inject electrical current into a formation, (ii) a measuring electrode deployed in and electrically isolated from the guard electrode, (iii) a return electrode spaced apart from the guard electrode, the return electrode providing a return path for the electrical current, and (iv) a dual function electrode interposed between the guard electrode and the return electrode; and
    a controller configured to: (a) inject electrical current into the formation at the guard electrode simultaneously at first and second frequencies, (b) set the electrical potential of the dual function electrode to a first low potential at the first frequency and to a second high potential at the second frequency, and (c) measure electrical currents in the measuring electrode at the first and second frequencies.

16. The logging while drilling tool of claim 15, wherein the first and second potentials are each less than or equal to an electrical potential of the guard electrode and greater than or equal to an electrical potential of the return electrode.

17. The logging while drilling tool of claim 15, wherein the first potential is substantially equal to an electrical potential of the return electrode and the second potential is substantially equal to an electrical potential of the guard electrode.

18. A method for microresistivity logging at multiple depths of investigation, the method comprising:
    (a) deploying a microresistivity logging tool in a borehole, the logging tool including (i) a guard electrode, (ii) a measuring electrode deployed in and electrically isolated from the guard electrode, (iii) a return electrode spaced apart the guard electrode, and (iv) a dual function electrode interposed between the guard electrode and the return electrode;

(b) causing an electrical current to be injected into a subterranean formation at the guard electrode simultaneously at first and second frequencies;
(c) causing an electrical potential of the dual function electrode to be set to a first low potential at the first frequency and to a second high potential at the second frequency;
(d) causing electrical currents to be measured at the measuring electrode at each of the first and second frequencies; and
(e) computing first and second quantities at least partially related to the formation resistivity from the electrical currents measured in (d) at the first and second frequencies.

19. The method of claim 18, wherein the first and second potentials are each less than or equal to an electrical potential of the guard electrode and greater than or equal to an electrical potential of the return electrode.

20. The method of claim 18, wherein the first potential in (c) is substantially equal to an electrical potential of the return electrode and the second potential in (c) is substantially equal to an electrical potential of the guard electrode.

21. The method of claim 18, wherein the microresistivity logging tool further comprises an azimuth sensor and (d) further comprises causing the azimuth sensor to measure an azimuth angle, the method further comprising:
(f) correlating the first and second formation resistivity values computed in (e) with the azimuth angle measured in (d).

* * * * *